US012728469B2

(12) United States Patent
Ahlgrimm et al.

(10) Patent No.: US 12,728,469 B2
(45) Date of Patent: Sep. 8, 2026

(54) NETWORK FOR CONTROLLING SOLDERING SYSTEMS AND METHOD THEREFOR

(71) Applicant: ERSA GmbH, Wertheim (DE)

(72) Inventors: Timon Ahlgrimm, Marktheidenfeld (DE); Klaus Rosenberger, Wertheim (DE)

(73) Assignee: ERSA GmbH, Wertheim (DE)

(*) Notice: Subject to any disclaimer, the term of this patent is extended or adjusted under 35 U.S.C. 154(b) by 693 days.

(21) Appl. No.: 18/037,353

(22) PCT Filed: Nov. 15, 2021

(86) PCT No.: PCT/EP2021/081694
§ 371 (c)(1),
(2) Date: May 17, 2023

(87) PCT Pub. No.: WO2022/106358
PCT Pub. Date: May 27, 2022

(65) Prior Publication Data

US 2023/0405701 A1 Dec. 21, 2023

(30) Foreign Application Priority Data

Nov. 18, 2020 (DE) ..................... 10 2020 130 466.8

(51) Int. Cl.
*B23K 3/047* (2006.01)
*B23K 1/00* (2006.01)
(Continued)

(52) U.S. Cl.
CPC .......... *B23K 3/0478* (2013.01); *B23K 1/0016* (2013.01); *B23K 3/033* (2013.01); *B23K 3/08* (2013.01)

(58) Field of Classification Search
CPC . B23K 3/033; B23K 3/03; B23K 3/08; B23K 2101/42; B23K 3/0478;
(Continued)

(56) References Cited

U.S. PATENT DOCUMENTS 4,935,600 A 6/1990 Pachschwoll
6,624,388 B1 9/2003 Blankenship et al.
(Continued)

FOREIGN PATENT DOCUMENTS

CN 1559737 A 1/2005
CN 1665634 A 9/2005
(Continued)

OTHER PUBLICATIONS

Bauernhansl, et. al, Control from the cloud, IIndustrie 4.0 in Produktion, Automatisierung vwd Logistik, 2014, pp. 235-247, O Springer Fachmedien Wiesbaden, Germany, DOI 10.1007/978-3-658-04682-8 12.

(Continued)

*Primary Examiner* — Vy T Nguyen
(74) *Attorney, Agent, or Firm* — George R. McGuire; Bond Schoeneck & King PLLC

(57) ABSTRACT

A network and a method for operating a network is provided. The network includes one or more soldering systems provided in the network, and the soldering systems each include at least one soldering apparatus for soldering electronic components, a user interface for outputting target-soldering-information to a user; and a way for determining actual soldering information. The network includes at least one input device for inputting and/or specifying work information, and a control unit which is designed to identify soldering systems provided in the network; create soldering tasks with target-soldering-information from the work infor- (Continued)

mation depending on the identified soldering systems and assign the tasks to the relevant soldering system; and process the actual soldering information of the relevant soldering system with the associated target-soldering-information of the relevant soldering system.

18 Claims, 2 Drawing Sheets

(51) Int. Cl.
*B23K 3/03* (2006.01)
*B23K 3/08* (2006.01)

(58) Field of Classification Search
CPC ........ B23K 1/0016; B23K 3/02; B23K 3/025; B23K 3/0338; B23K 3/0353; B23K 3/0471; B23K 3/0615; B23K 31/125; B23K 1/0008; B23K 1/008; B23K 1/018; B23K 1/19; B23K 1/203; B23K 2101/20; B23K 2101/36; B23K 2103/04; B23K 2103/18; B23K 2103/52; B23K 3/028; B23K 3/0346; B23K 3/0653; B23K 31/025; H05K 1/0268; H05K 1/0269; H05K 2203/04; H05K 2203/163; H05K 3/306; H05K 3/34; H05K 3/341; H05K 3/3442; H05K 3/3485; G01B 21/08; G05B 2219/39114; G05D 23/22; G06F 13/4282; H10W 72/01231; H10W 72/01251; H10W 72/072; H10W 72/07234; H10W 72/07236; H10W 72/073; H10W 72/07337; H10W 72/07527; H10W 72/252; H10W 72/29; H10W 72/352; H10W 72/354; H10W 72/552; H10W 72/5522; H10W 72/59; H10W 72/856; H10W 72/923; H10W 72/932; H10W 72/952; H10W 74/00; H10W 74/012; H10W 74/114; H10W 74/15; H10W 90/724; H10W 90/734
USPC ....... 219/240, 229, 231, 241, 497, 501, 506; 228/9, 103, 260, 37, 51, 8; 257/713, 257/E21.503, E21.511; 340/588, 655, 340/815.4
See application file for complete search history.

(56) References Cited

U.S. PATENT DOCUMENTS

| | | | |
|---|---|---|---|
| 2013/0075380 A1 | 3/2013 | Albrech et al. | |
| 2015/0083233 A1 | 3/2015 | Smith et al. | |
| 2019/0047066 A1* | 2/2019 | Matsuzaki | B23K 3/0346 |
| 2020/0223004 A1 | 7/2020 | Mochizuki et al. | |

FOREIGN PATENT DOCUMENTS

| | | |
|---|---|---|
| CN | 109814433 A | 5/2019 |
| CN | 110977104 A | 4/2020 |
| EP | 3476516 A1 | 5/2019 |
| ES | 2357217 T3 | 4/2011 |
| JP | H10118897 A | 5/1998 |
| JP | 2001150128 A | 6/2001 |
| JP | 2007220966 A | 8/2007 |
| JP | 2014229262 A | 12/2014 |
| JP | 2020006430 A | 1/2020 |

OTHER PUBLICATIONS

German Office Action for App. No. DE 10 2020 130 466.8, dated Sep. 6, 2023, pp. 1-8.
Translated German Office Action for App. No. DE 10 2020 130 466.8, dated Sep. 6, 2023, pp. 1-8.
Translated ES Office Action; Application No. 202390027; Dated Feb. 7, 2025, Entire document.
Translated ES Office Action, Application No. 202390027, dated Nov. 23, 2023, pp. 1-14.
International Search Report and Written Opinion for PCT/EP2021/081694 filed Nov. 15, 2021. pp. 1-7. Mailing date of Search Report Mar. 1, 2022.
International Preliminary Report on Patentability, dated Nov. 2, 2022. pp. 1-34.
Translated Japanese Office Action, Application No. 2023-525622, dated Jun. 4, 2024, entire document.
Translated CN Office Action; Application No. 202180077356.3; Dated Nov. 13, 2025, Entire document.

* cited by examiner 10
20
12
34
36
38
50
52
42
40
39
32
30
28
48
46
44
26
14/16
18
22

NETWORK FOR CONTROLLING SOLDERING SYSTEMS AND METHOD THEREFOR

CROSS-REFERENCE TO RELATED APPLICATION

The present application is a U.S. National Stage application based on International Application PCT/EP2021/081694, filed Nov. 15, 2021, which claims priority to German Application No. 10 2020 130 466.8, filed Nov. 18, 2020, the entirety of each of which is hereby incorporated by reference.

BACKGROUND

The invention relates to a network having one or more soldering systems provided in the network. Individual soldering systems each comprise a soldering apparatus for soldering electronic components. It is known from EP 3 476 516 A1, for example, to network a plurality of soldering modules to one another by means of wireless data connections to form a soldering apparatus.

A network having a plurality of soldering systems and a server for remote maintenance and updating software of the soldering systems is in U.S. Pat. No. 6,624,388 B1.

SUMMARY OF THE INVENTION

The object of the present invention is to provide a network having a plurality of soldering systems with which soldering processes can be controlled, monitored and managed in a simple manner.

This object is achieved by a network having one or more soldering systems provided in the network.

The soldering systems provided in the network each comprise at least one soldering apparatus for soldering electronic components. The soldering apparatus can in particular be designed as a manually operable soldering apparatus, for example as a soldering iron or as an automatic or semi-automatic soldering apparatus, for example as a heating head of a rework soldering station. Soldering stations, rework soldering systems or fully automatically operating systems such as soldering robots are suitable as soldering systems.

The soldering systems each comprise a user interface for outputting target-soldering-information to a user of the relevant soldering apparatus. The target-soldering-information can include, in particular, target soldering parameters to be adjusted and target soldering utensils to be used. The network can be designed in such a way that the soldering system adjusts the soldering apparatus at least partially automatically in accordance with the specifications of the soldering task or the target-soldering-information, in particular adjusts the soldering temperature according to the target soldering temperature at the beginning of performing the soldering task.

In addition, the soldering systems each comprise means for determining actual-soldering-information, i.e., in particular the actual soldering temperature and the actual soldering utensils, that is to say the soldering utensils which are actually used during the soldering process. The means for determining actual-soldering-information also include sensors and mathematical functions and algorithms.

The network further comprises an input device for inputting and/or specifying work information, i.e., in particular information about which components are to be soldered by which specifications. The user interface can also form the input device; however, the input device can also be configured remotely from the user interface.

Furthermore, a control unit is provided which is configured to identify soldering systems provided in the network, assign the work information to the suitable soldering system in each case or create soldering tasks with target-soldering-information from the work information depending on the identified soldering systems, and assign said tasks to the relevant soldering system, and process and in particular compare the actual-soldering-information of the relevant soldering system with the associated target-soldering-information of the relevant soldering system.

The control unit can further be configured to identify soldering systems provided in the network and to assign the relevant target-soldering-information to said soldering systems depending on the identified soldering systems.

The control unit can therefore create soldering tasks with target-soldering-information from the work information for one or more identified soldering systems and assign said tasks to the relevant soldering system. The control unit consequently recognizes which soldering system is suitable for which soldering task and assigns the soldering task to the relevant soldering system. Furthermore, the control unit is in particular also aware of the utilization of the individual soldering systems so that soldering tasks can be assigned to the soldering systems which are available or which have free capacities.

Such a network increases production and elevates productivity. Efficient and functionally reliable soldering of electronic components can be provided.

Furthermore, the control unit is advantageously configured to carry out a data evaluation of the target-soldering-information of a soldering task and the actual-soldering-information of the soldering system to which the soldering task is assigned and which performs the soldering task, and to create a data report assigned to the soldering task while or after performing the soldering task. Consequently, it is understandable from the data report with which target-soldering-information and which actual-soldering-information the electronic components have been soldered, which ultimately yields complete data documentation. On the basis of the data report, comprehensive data documentation, and therefore verification of the soldering results, is possible.

Furthermore, it is advantageous if the control unit is configured such that the data evaluation makes a comparison of the target-soldering-information with the actual-soldering-information of a soldering task, and if the data report comprises a quality report and/or tool usage report assigned to a soldering task based thereon. The quality of the soldering process can consequently be assessed by means of the quality report. If the target-soldering-information at least mostly matches the actual-soldering-information, good or very good quality can be certified. The further the actual-soldering-information deviates from the target-soldering-information, the lower the quality of the soldering process.

The number of performed soldering tasks and the associated actual-soldering-information can also be used to deduce wear or consumption of the tools. The tools can in particular be wearing materials such as soldering tips to be used, or consumables such as flux material or solder material. Furthermore, the tools can be heating elements of the soldering apparatus to heat the soldering tips, which elements are also subject to thermal wear. Consequently, a signal can be generated on the basis of the tool usage report in good time before the tools have reached their service life, according to which the user is requested to replace the relevant tool.

The control unit is further advantageously configured such that it provides the target-soldering-information, the actual-soldering-information and/or the data report of the input device and/or the user interface. For example, the target-soldering-information, the actual-soldering-information and/or the data report can then be displayed or output on the input device and/or the user interface. The relevant user can therefore obtain additional information about the already performed soldering tasks and the pending soldering tasks.

Advantageously, the target-soldering-information comprises a target soldering temperature, wherein a temperature sensor for determining the soldering temperature is then provided as means for determining the actual-soldering-information. Furthermore, the target-soldering-information can comprise a use of defined soldering utensils, wherein a reading device for reading a code which is provided on the soldering utensils and identifies the soldering utensils is then provided as means for determining the actual-soldering-information. The code can consequently be provided in particular on soldering apparatuses, for example on a soldering iron, on soldering tips, on soldering means, or also on flux. The target soldering utensils then comprise in particular the soldering means to be used, a flux to be used and/or a soldering tip to be used, wherein then the actual soldering utensils then comprise in particular the used soldering means, the used flux and/or the used soldering tip. A code can be provided on all soldering utensils to be used, which can be read in with a reading device. The soldering objects and a soldering job can also each bear a readable code for identification. The information that is read in is made available for data evaluation.

The code can in particular be a two-dimensional code in the form of a barcode or a QR code. Furthermore, it is conceivable that the code is designed, for example, as an RFID tag or the like.

Furthermore, it is conceivable that an input means for determining or entering the relevant soldering apparatus and/or the relevant user is provided as means for determining actual-soldering-information, and that the data report comprises this information. This has the advantage that the data report is completed about the soldering apparatus and/or the person who performs the soldering task in the network.

According to the invention, it is further conceivable that a time measuring means for generating time information such as a start, an end and/or a time period for performing a soldering task by the soldering apparatus and/or a user is provided as means for determining actual-soldering-information, and that the data report comprises the time information. The data report can consequently read out the time at which the soldering task was performed and for how long.

The input device can advantageously be designed as a stationary terminal, as a mobile terminal and/or as a manufacturing execution system (MES). A user PC can be considered a stationary terminal, for example. A laptop, notebook, tablet or smartphone can be used as the mobile terminal. The MES can be configured to cover the network and feed corresponding pending and/or completed soldering tasks into the network.

Furthermore, it has been found to be advantageous if the user interface is configured to output instructions to users for performing the soldering task and/or status information, primarily actual-soldering-information. The user interface consequently allows the user to obtain helpful information, in particular about the soldering process to be carried out thereby. For example, they can point out a target soldering temperature, in particular if the actual soldering temperature deviates from the target soldering temperature. It is also conceivable for them to point out component-specific special features for best performing the soldering task. Furthermore, status information about the relevant status of the soldering apparatus or actual-soldering-information can be output. The user can be informed, for example, at predeterminable intervals about the status information, such as soldering temperature, soldering duration, etc.

The user interface can provide bidirectional communication, wherein the control unit is then configured such that the user can direct instructions and/or questions to the soldering system, and the control unit provides feedback and/or generates responses that are output by the user interface. This increases process reliability since whenever the user is uncertain while performing a soldering task, they can refer to instructions and direct questions to the soldering system.

It is advantageous if the user interface is configured as a voice input and/or voice output device, and/or if the user interface is designed as a gesture input device integrated into the soldering apparatus. The provision of a voice input and voice output device has the advantage that the user can communicate during the soldering process without having to put down the soldering apparatus. The user then receives voice instructions for performing a soldering task. The gesture input device has the advantage that the user can communicate with the soldering apparatus by means of predetermined gestures. Of course, it is conceivable that the user interface can also be designed as a display or include a display in addition to other devices.

According to the invention, it is also conceivable that the input device can be formed by the user interface. The input device and the user interface can be formed by a mobile terminal such as a laptop, a notebook, a smartphone or a tablet. However, the input device can also be separated from the user interface and be arranged remotely. In particular when the input device is an MES, this is not identical to the user interface.

The control unit can further be designed and configured to form the soldering task from a plurality of soldering recipes. The soldering task preferably defines primarily what needs to be done, wherein the soldering recipes define what specifically should be done in conjunction with the relevant soldering system. A soldering task can therefore consist of a plurality of soldering recipes.

The network as such can comprise different work regions, wherein soldering systems are assigned to the different work regions. A group of soldering systems can form a work region.

The above-mentioned object is also achieved by a method for operating in particular a network according to the invention, characterized in that soldering systems provided in the network are identified, in that soldering tasks with target-soldering-information are created from the work information for one or more identified soldering systems and are assigned to the relevant soldering system, and in that a data evaluation of the target-soldering-information of a soldering task and of the actual-soldering-information of the soldering system is carried out, which system is assigned the soldering task and which performs the soldering task, and a data report assigned to the soldering task is created while or after performing the soldering task. The method can furthermore be operated with the features described on the network according to the invention.

Further details and advantageous embodiments of the invention can be found in the following description with which exemplary embodiments of the invention are described and explained in more detail.

DETAILED DESCRIPTION

Figure 1:
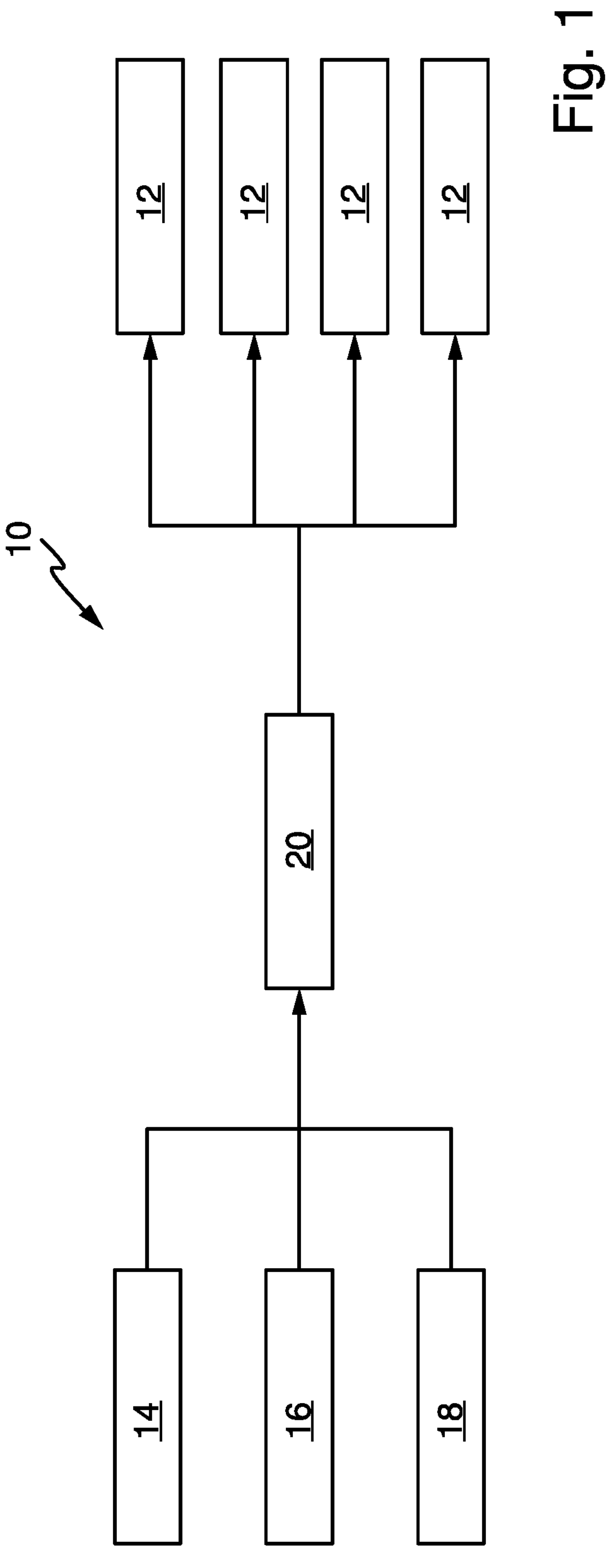
FIG. 1 shows a systematic representation of a network according to the invention.

FIG. 1 shows a network 10 in which a plurality of soldering systems 12 are provided. The soldering systems 12 each comprise at least one soldering apparatus for soldering electronic components. FIG. 1 shows three different input devices 14, 16, 18, wherein the input device 14 can be a stationary terminal such as a PC. The input device 16 can be a mobile terminal, for example a tablet. The input device 18 can be a manufacturing execution system (MES).

A control unit 20 is provided between the input devices 14, 16, 18 and the soldering systems 12. The control unit 20 can be formed by a server that is hosted or operated by corresponding software. The control unit 20 or the associated server can be an independent system. However, it is conceivable for the control unit 20 to also be integrated in one of the input devices 14, 16, 18 or in a soldering system 12.

The control unit 20 is configured to identify soldering systems 12 present in the network 10. The control unit 20 is further configured to process the work information coming from the input devices 14, 16, 18 and to create soldering tasks with target-soldering-information for the soldering systems 12 and assign said tasks to the individual soldering systems 12.

The soldering tasks can then be performed with the soldering systems 12 or with the soldering apparatuses of the soldering systems 12. The soldering systems 12 further comprise means for determining actual-soldering-information. These means for determining the actual-soldering-information determine the actual-soldering-information when performing the soldering task.

The control unit 20 is further configured to carry out a data evaluation of the target-soldering-information of a soldering task and the actual-soldering-information of that soldering system 12 to which the relevant soldering task is assigned and which then performs the relevant soldering task. From the data evaluation, a data report assigned to the soldering task can be created while or after performing the soldering task.

The work information of the input devices 14, 16, 18 can be independent of the soldering systems 12; the control unit 20 assigns this work information, or the resulting soldering task, to the suitable soldering system 12 in each case. The soldering systems 12 can in turn communicate their actual-soldering-information continuously to the control unit 20. The actual-soldering-information can be displayed to the operator via the selected input devices 14, 16, 18 and/or on the user interfaces 14, 16.

Figure 2:
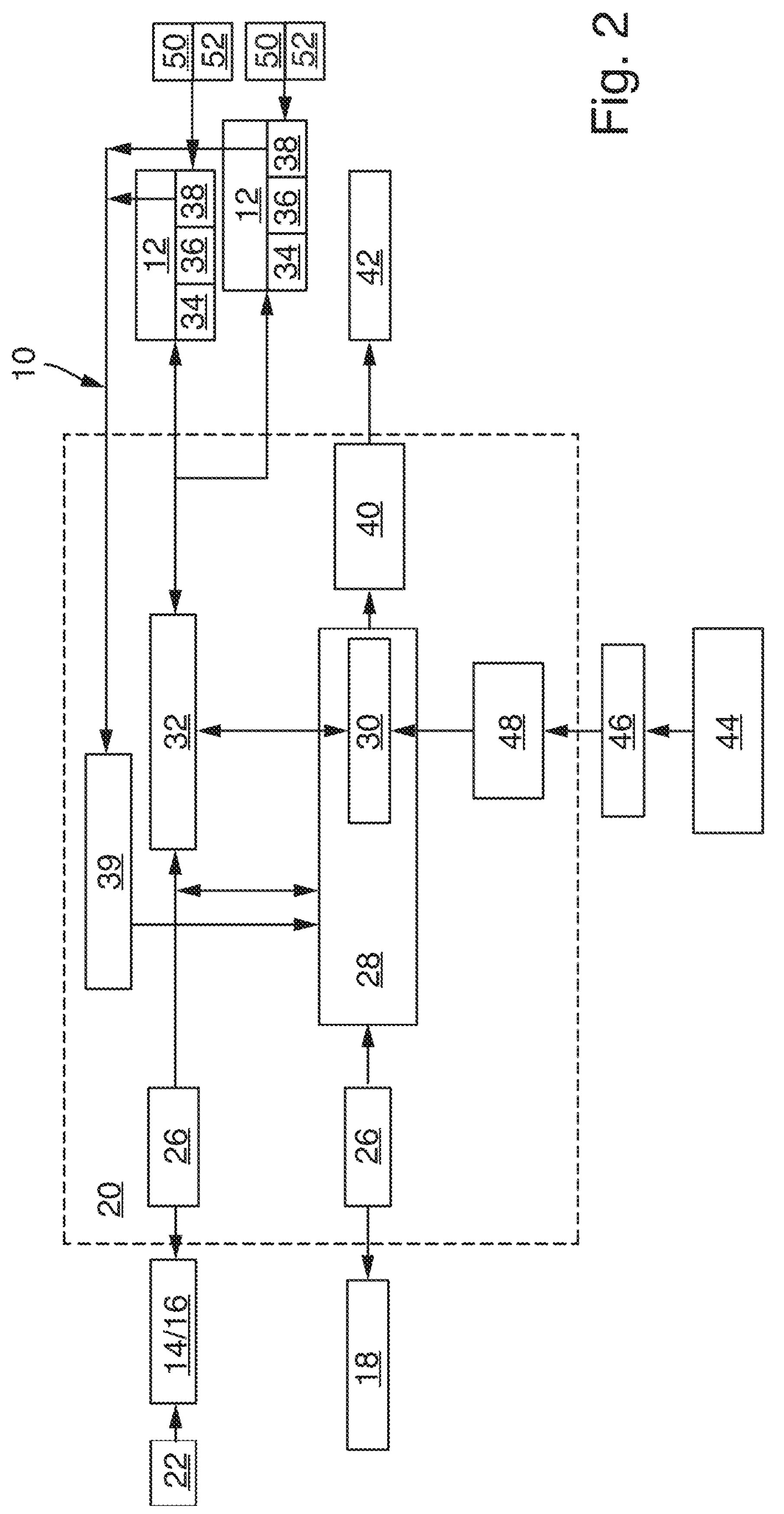
FIG. 2 shows a more detailed representation of the information flow in a network according to the invention.

FIG. 2 shows an expanded, schematic representation of a network according to the invention, wherein the components corresponding to FIG. 1 are identified in FIG. 2 with corresponding reference numbers.

The input devices 14, 16, which can also be used as a user interface, are also for a user 22 to input and/or specify work information.

The soldering systems 12 are assigned to a work region 24. The control unit 20 identifies the soldering systems 12 provided in the network 10 or their work regions 24, and depicts them virtually as the work region 24' and soldering system 12'.

The work information 26 specified by the input devices 14, 16, 18 is fed to the control unit 20. Soldering tasks 28 are created for the relevant soldering system 12 from the work information 26 and the identified soldering systems 12, which tasks define what and how something must be done. The specific handling instruction to the user 22 is then defined as a soldering recipe 30. The soldering task 28 or the soldering recipe 30 then generates target-soldering-information 32 which contains in particular the target soldering parameters and the target soldering utensils which the user is to use for performing the soldering task. The target-soldering-information 32 is then output on the soldering systems 12 or on user interfaces 36 of the soldering systems 12 and is therefore brought to the attention of the user 22. The soldering system 12 and also the user 22 consequently receive all the target-soldering-information which is required for performing the soldering task 28. In particular it can be specified which soldering temperature is to be used, which soldering tip is to be used, which flux is to be used, and which soldering means is to be used. In addition, it can be specified which component is to be soldered at what location.

The soldering systems 12 each comprise at least one soldering apparatus 34 for soldering the electronic components, a user interface 36 for outputting the actual-soldering-information 39 and target-soldering-information 32 to the user 22, and means 38 for determining actual-soldering-information 39. The actual-soldering-information 39 includes the actual soldering parameters, i.e., the actual soldering parameters and the actually used soldering utensils, i.e., the actual soldering utensils. At the start of performing the task 28, the soldering apparatus 34 can be automatically adjusted to the predetermined soldering temperature on the basis of the target-soldering-information 32, for example, from the soldering system 12.

The user 22 therefore receives specific handling instructions via the user interface 36, that is to say the target-soldering-information 32 for performing the soldering task 28. In this case, the soldering system 12 can automatically adjust the soldering apparatus 34 in accordance with the specifications of the target-soldering-information 32. While the soldering task 28 is being executed by the user 22, the actual-soldering-information 39 is determined with the means 38. This actual-soldering-information 39 is communicated to the control unit 20. The control unit 20 carries out a data evaluation 40 of the target-soldering-information 32 and the actual-soldering-information 39 generated using the means 38, wherein a data report 42 is created from the data evaluation 40.

In order to identify the used soldering utensils 44, a reading device 46 is provided, by means of which a code provided on the soldering utensils, that is to say on the soldering tip, the flux and/or the solder, can be read in. The reading device 46 can be part of the soldering system 12 and is in particular formed by the means for determining actual-soldering-information. The actual utensils 48 read in with the reading device 46 are made available to the control unit 20 in order to also ultimately create the data evaluation 40 and the data report 42 from these actual utensils.

The data report 42 can in particular be made available to the user interfaces 36 or to the input devices 14, 16 and to the MES, or may be further processed and/or output there.

Via the means 38 for determining the actual-soldering-information, a user identification of the user 22 can in particular also be entered so that it can be understood which person ultimately completed the soldering task 28.

In addition, a quality report and a tool usage report can be created from the data report 42. In the quality report, it is possible in particular to evaluate the target-soldering-information 32 with the actual-soldering-information 39, wherein larger deviations of the actual-soldering-information 32 from target-soldering-information 39 indicate a lower quality of the soldering process. The actual-soldering-information 39 can be used to deduce in particular the duration and manner of using the soldering utensils 44 from which the tool usage report can be derived. Before reaching a critical usage limit or critical wear, it is conceivable that the user 22 is requested via the user interfaces 36 to exchange corresponding components or soldering utensils.

The means 38 for determining the actual-soldering-information 39 can comprise various means, in particular a temperature sensor for determining the soldering temperature, an input means 50 for determining the relevant user, a time measuring means 52 for generating time information such as the start, the end, and a time period for performing a soldering task.

The user interfaces 36 can in particular be designed as a voice input and voice output device. The user 22 can then obtain voice instructions for performing the soldering task 28. The user interfaces 36 can also provide displays for outputting further information. The design of the user interfaces 36 is further such that the user 22 can direct instructions or questions to the soldering system 12, and such that the control unit 20 or the network 10 provides feedback or generates responses that are output on the relevant user interface 36.

A qualitative evaluation of the soldering process is therefore possible. Consequently, the entire soldering process with associated soldering parameters and soldering utensils can be logged by creating the data report. In particular, when the actual-soldering-information 39 significantly deviates from the target-soldering-information 32, defective soldering processes can also be identified in retrospect. In addition, a plurality of soldering systems 12 and associated work regions 24 can be managed centrally by means of the control unit 20. Finally, the soldering quality can be determined using the data report 42. Overall, quality can thereby be ensured, and quality can be increased. By recording the user 22, the soldering systems 12, the associated work regions 24, the used utensils 44, the actual-soldering-information 39 and the soldering tasks 28 as well as the associated recipes 40, the conditions under which the relevant soldering task 28 was actually performed can ultimately be demonstrated. Increased quality assurance and quality improvement can thereby be achieved.

What is claimed is:

1. A network having a plurality of soldering systems provided in the network, wherein each soldering system comprises:

a. at least one soldering apparatus for soldering electronic components, b. a user interface for outputting target-soldering-information to a user, and c. means for determining actual-soldering-information, wherein the network comprises:

d. at least one input device for inputting and/or specifying work information, and e. a control unit which is designed to:

i. identify soldering systems provided in the network;

ii. process work information coming from the at least one input device, the work information being independent of the soldering systems provided in the network, iii. create soldering tasks with target-soldering-information from the work information depending on the identified soldering systems;

iv. recognize which soldering system is suitable for which soldering task;

v. assign each of said soldering tasks to a suitable soldering system; and vi. process the actual-soldering-information of the suitable soldering system to which the respective soldering task is assigned with the associated target-soldering-information of that suitable soldering system.

2. The network according to claim 1, characterized in that the control unit is further configured to carry out a data evaluation of the target-soldering-information of a soldering task and the actual-soldering-information of the soldering system to which the soldering task is assigned and which performs the soldering task.

3. The network according to claim 2, characterized in that the control unit is further configured such that the data evaluation comprises a comparison of the target-soldering-information with the actual-soldering-information of a soldering task, and in that the data report comprises a quality report and/or tool usage report assigned to a soldering task based thereon.

4. The network according to claim 1, characterized in that the control unit is further configured to create a data report assigned to the soldering task while or after performing the soldering task.

5. The network according to claim 1, characterized in that the control unit is further configured such that the control unit provides the target-soldering-information, the actual-soldering-information and/or the data report to the input device and/or the user interface.

6. The network according to claim 1, characterized in that the target-soldering-information comprises a target soldering temperature, and in that a temperature sensor for determining the soldering temperature is provided as means for determining the actual-soldering-information.

7. The network according to claim 1, characterized in that the target-soldering-information comprises a use of defined target soldering utensils, and in that a reading device for reading a code which is provided on the soldering utensils and identifies the actual soldering utensils is provided as the means for determining the actual-soldering-information.

8. The network according to claim 7, characterized in that the target soldering utensils comprise a soldering means to be used, a flux to be used and/or a soldering tip to be used, and in that the actual soldering utensils comprise the used soldering means, the used flux and/or the used soldering tip.

9. The network according to claim 1, characterized in that a user identification of a relevant user is entered via the means for determining actual-soldering-information, and in that the data report comprises information identifying the relevant user.

10. The network according to claim 1, characterized in that a time measuring means for generating time information for performing a soldering task by the user is provided as the means for determining actual-soldering-information, and in that the data report comprises the time information.

11. The network according to claim 1, characterized in that the input device is designed as a stationary terminal, as a mobile terminal and/or as a manufacturing execution system (MES).

12. The network according to claim 1, characterized in that the user interface is configured to output instructions to the user for performing the soldering task and/or actual-soldering-information.

13. The network according to claim 1, characterized in that the user interface provides bidirectional communication and in that the control unit is configured such that the user can direct instructions and/or questions to the soldering system, and in that the control unit provides feedback and/or generates responses that are output by the user interface.

14. The network according to claim 1, characterized in that the user interface is configured as a voice input and/or voice output device, and/or in that the user interface is designed as a gesture input device integrated into the soldering apparatus.

15. The network according to claim 1, characterized in that the input device is formed by the user interface.

16. The network according to claim 1, characterized in that the control unit is further configured to form the soldering task from a plurality of soldering recipes.

17. The network according to claim 1, characterized in that the network comprises different work regions, and in that respective soldering systems are assigned to the different work regions.

18. A method for operating a network having a plurality of soldering systems provided in the network, the method comprising the steps of:

a. identifying the soldering systems provided in the network, b. processing work information coming from input devices, the work information being independent of the soldering systems provided in the network, c. creating soldering tasks with target-soldering-information from the work information for one or more identified soldering systems d. recognizing which soldering system is suitable for which soldering task;

e. assigning each of said soldering tasks to the suitable soldering system, f. carrying out a data evaluation of the target-soldering-information of said soldering task and the actual-soldering-information of the soldering system, which system is assigned the soldering task and which performs the soldering task, and creating a data report assigned to the soldering task while or after performing the soldering task.

* * * * *